United States Patent Office 2,981,568
Patented Apr. 25, 1961

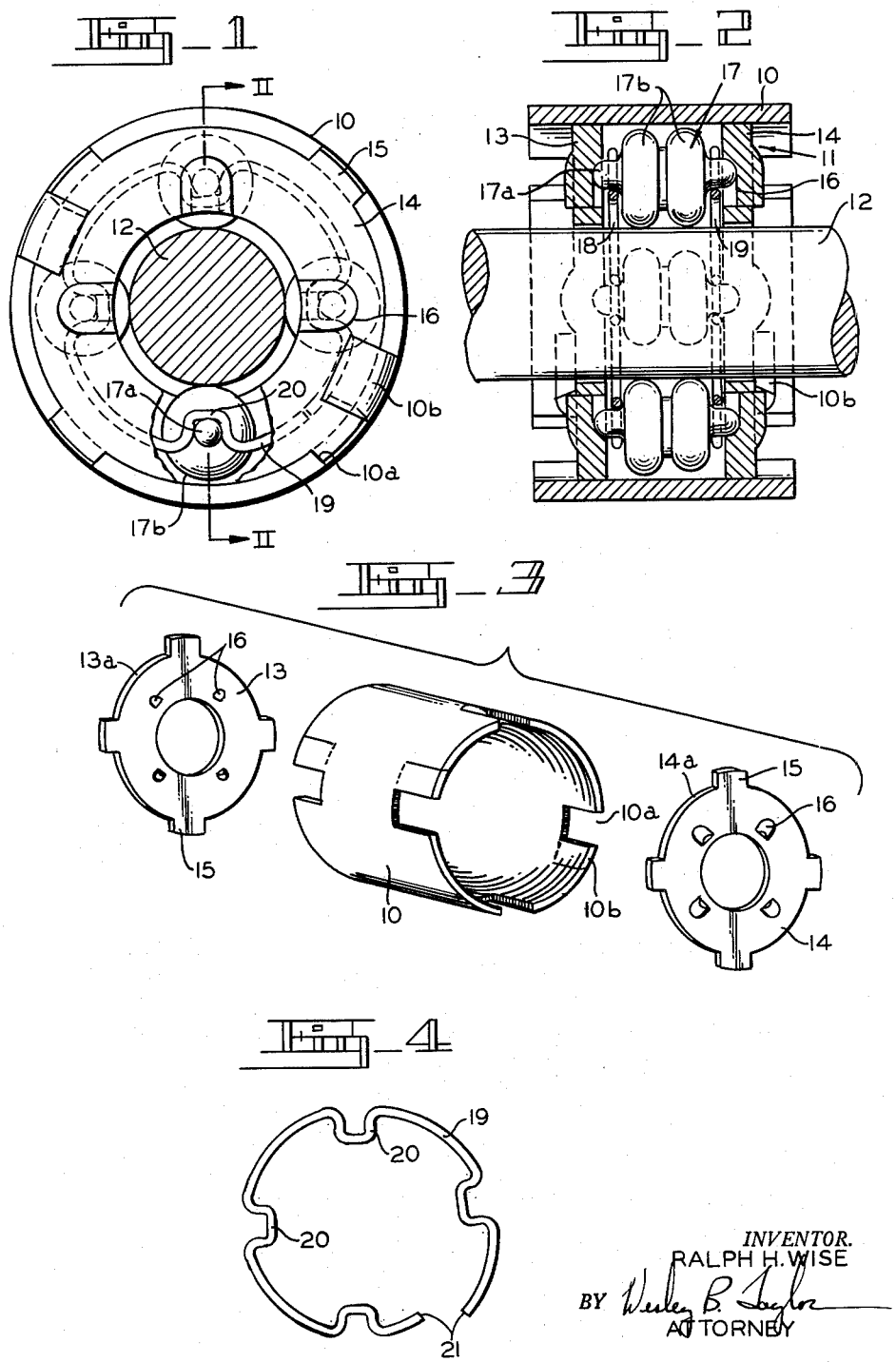

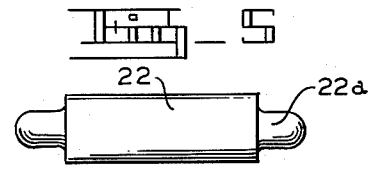
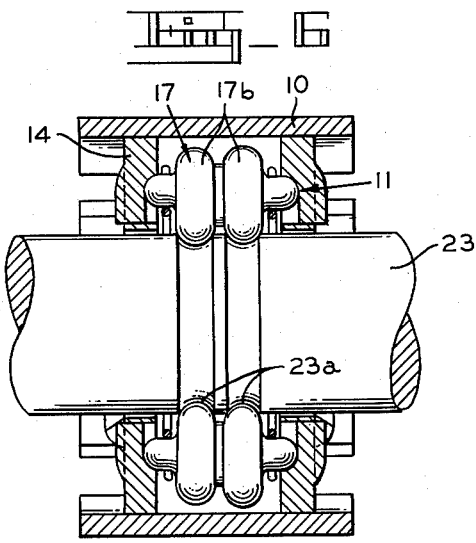
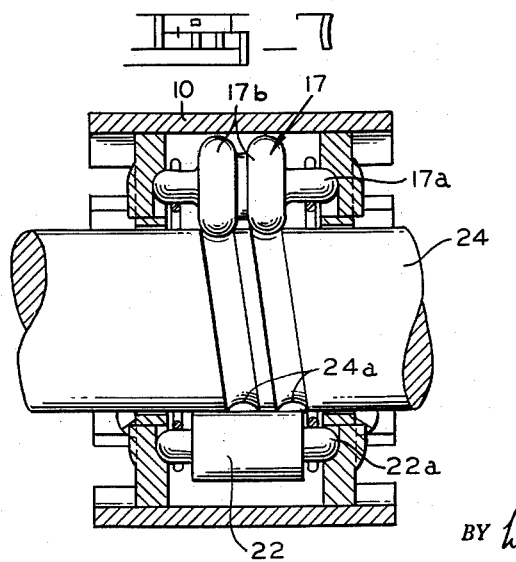

2,981,568

BEARING STRUCTURE

Ralph H. Wise, Gary, Ind., assignor, by mesne assignments, to The Anderson Company, a corporation of Indiana Filed Feb. 3, 1956, Ser. No. 563,235

8 Claims. (Cl. 308—6)

The present invention relates to antifriction or bearing means and, more particularly, to an improved bearing structure for accommodating relative rotary movement between two telescoping members.

In many industrial applications it is necessary to rotate one member relative to another. A shaft rotating in a bearing is a very common example of this. The present invention provides antifriction or bearing means of improved and simplified structure for this and similar applications.

My bearing means eliminates the need for races. Yet a shaft or a like member can be removed from the present bearing without losing or otherwise upsetting the bearing elements. The present bearing means is easy to make from inexpensive materials. Nevertheless, the instant bearing structure readily provides relative rotary movement between two telescoping members at low friction. If desired, the bearing means can also be adapted to prevent relative longitudinal movement between the two members. Further, the present bearing structure and shaft means can be adapted to move longitudinally with respect to each other, in addition to the relative rotary movement, at a predetermined time and to a controlled extent.

In one form, my bearing means may comprise a tubular casing in which a rod, shaft, bar or like member rotates. Floating bearing means is interposed between the casing and shaft. Such bearing means may include supports spaced axially of and between the casing and shaft and provided with radially extending journaling recesses. Elongate bearing elements are journaled between the supports and engage the recesses. A spring urges the bearing elements radially outwardly along the radially extending recesses and maintains the elements in position.

To prevent relative longitudinal movement between the casing and shaft, the latter may have a groove extending around its periphery and a bearing element may have a radially enlarged bearing portion which rides in the groove. By providing the groove with an axial extent or travel along the shaft, the casing and shaft may also undergo relative longitudinal movement, simultaneously with their relative rotary movement, as dictated by the disposition of the groove about the shaft.

The accompanying drawings illustrate a presently preferred embodiment wherein:

Figure 1 is an end view of a bearing structure embodying the present invention;

Figure 2 is a longitudinal section of Figure 1 on the line II—II;

Figure 3 is a perspective exploded view of a casing and ring supports of Figure 2 prior to assembly;

Figure 4 is a diagrammatic view of an annular wire spring used in the bearing structure and shows one end of the spring sprung outwardly prior to assembly with the other bearing parts;

Figure 5 is a diagrammatic view of another type of bearing element which may be used; and Figures 6 and 7 are sectional views similar to that of Figure 2 and illustrate modifications.

Referring to the drawings, the embodiment of Figures 1 through 4 includes an outer tubular casing 10 having four slots or notches 10a at each end. The ends of the casing are also provided with lugs 10b which for convenience may be formed immediately adjacent the notches 10a and may be turned inwardly as hereinafter noted. Antifriction means generally indicated at 11 is stationed within the casing to receive a shaft 12 for relative rotary movement with respect to the casing. Normally, the casing is stationary and held in place by suitable fasteners or clamps, not shown, and the shaft 12 is the actual moving member, but the reverse is possible as well.

The antifriction means 11 includes a pair of support rings 13 and 14. Each ring has tabs 15 which fit within the notches 10a of the casing. The outer peripheries 13a and 14a of the rings preferably abut against the inside of the casing as shown in Figure 2 to rigidify the structure. Each ring 13 and 14 is upset, struck, or offset at a plurality of points around the facing sides of the two rings to define radially extending journaling recesses or grooves 16.

The present bearing means is designed for bearing elements having a greater length than width. Bearing elements of this shape are preferred to those of small size such as ball bearings or similar bearings of spherical shape. Bearings of the type first mentioned are easier to handle, as when assembling the bearing unit, and are more readily manufactured and less likely to be lost. Yet such bearing elements provide an effective low frictional operation since the elements still have a small contact area with an inner telescoping member and particularly one of arcuate cross section.

For example, elongate bearing elements 17 (Figure 2) may be used. These elements are preferably tempered and have ends or shaft portions of reduced diameter to form pintles or trunnions 17a which are journaled between the support rings 13 and 14 and in the radially extending recesses 16.

In the preferred form, the elongate bearing elements have radially enlarged bearing surfaces such as those indicated at 17b on the elements 17. These surfaces may be substantially of toroidal shape. The curved periphery of a bearing surface 17b, particularly when toroidal as mentioned, makes substantially a point contact with an inner telescoping member such as the shaft 12.

Means are employed to urge the bearing elements 17 radially outwardly and preferably to the outer extremities of the journaling recesses 16. Resilient means are preferred for this function and in the embodiment illustrated take the form of a pair of annular wire springs 18 and 19 which may be made from spring steel. Each spring has a fluted periphery or an undulating shape in a circumferential direction so that the inwardly disposed sections define seats 20 (Figure 4). The seats 20 of one spring are substantially aligned with a corresponding seat of the other spring and also aligned with the recesses 16 axially of the casing 10. The seats 20 of the springs engage the trunnions 17a of the bearing elements to thrust or urge the latter outwardly along the recesses 16. As shown in Figure 4, each spring may have split ends 21 and be sprung outwardly to define a greater than true circular form. Consequently, when the springs 18 and 19 are compressed to a substantially true circular form for assembly with the other parts of the bearing structure, energy is stored within the springs to urge the bearing elements outwardly as described.

The shape of the bearing elements is not critical. The elements may be variously formed to fit the configuration of the inner member of the two telescoping parts or to engage the inner member at spaced-apart points in the manner of elements 17. For example, where an increased area of frictional contact is not undesirable, the bearing elements may have a central section 22 of uniform diameter (Figure 5) terminating in shaft portions 22a. However, in addition to the advantage previously noted, bearing elements having an enlarged radial bearing surface like the elements 17 provide another advantage in that they can be used to prevent relative longitudinal movement between a casing and shaft. In this case, a shaft 23 (Figure 6) or other like member is provided with grooves 23a which extend around the periphery of the shaft and are spaced apart to register with the spaced-apart bearing surfaces 17b of the bearing elements 17. If desired, only one groove and one radially enlarged bearing surface may be used. As illustrated, the bearing surfaces 17b ride in the grooves 23a inwardly of the maximum diameter of the shaft 23 and thereby prevent unwanted relative longitudinal movement between the casing 10 and the shaft 23.

The structure last described may be further modified, so that the unit becomes a combined bearing and actuating device. For example, referring to Figure 7, a shaft 24 may be used having parallel continuous grooves 24a extending about its periphery. Each of the grooves 24a has an axial extent or travel along the shaft 24 as indicated. One of the bearing elements is like the bearing element 17, and its radially enlarged bearing surfaces 17b ride in the grooves 24a. The other bearing elements of the embodiment may slide longitudinally of the shaft as well as make a rolling engagement with it and accordingly may be like the bearing element of Figure 5 wherein the central section 22 bridges the grooves 24a. Obviously, the grooves 24a may follow any desired path about the shaft 24, so that upon relative rotation between the casing 10 and shaft 24, there is also a relative longitudinal movement between these parts at a desired time and to a controlled extent as dictated by the disposition of the grooves 24a about the shaft 24.

The bearing structure of the present invention may be easily assembled. In one manner of assembling the structure, one of the support rings, for example ring 13, is first inserted within the casing substantially to the position indicated in Figure 2 with the tabs 15 of the ring engaging the notches 10a of the casing. Spring 18 is next inserted between the casing 10 and shaft 12, and the seats or notches 20 of the spring aligned with the journaling recesses 16 of the ring 13. A shaft, which may be a dummy shaft for the sole purpose of assembling the unit, is next inserted through the casing and ring 13, after which the bearing elements 17 or 22 are inserted endwise through the open end of the casing and the leading trunnions thereof stationed in the seats 20 and recesses 16 of the spring 18 and ring 13, respectively. The second spring 19 is then placed in position similarly to spring 18, and the support ring 14 next brought into position with its tabs 15 inserted in the notches 10a of the casing. The lugs 10b at both ends of the casing are now turned inwardly as by a suitable tool. The shaft may now be removed, and the annular springs 18 and 19 will still maintain the bearing elements in position.

When the embodiments of Figures 6 and 7 are assembled, the procedure may be the same, the radially enlarged bearing surfaces 17a of the elements or their equivalent being seated within the grooves 23a or 24a of the shaft of the assembly upon the insertion of such elements in the casing. In these cases, the shaft so assembled is ordinarily the shaft which is used in practice, since the nesting of the radially enlarged bearing surfaces in the grooves ordinarily prevents an easy withdrawal of the shaft.

After assembly, the lugs 10b of the casing prevent movement of the support rings 13 and 14 toward the ends of the casing 10, and the urging of the elements radially outwardly in the recesses 16 as described prevents the support rings from moving toward one another. The tabs 15 on the rings prevent relative rotary movement between the casing and rings. Consequently, the support rings need not be rigidly fixed along their outer edges 13a and 14a to the casing as by welding or any other like operation.

It will be noted that the present bearing structure eliminates the need for races. A shaft may be removed from the present bearing means without losing or otherwise upsetting the bearing elements. The instant bearing structure is easy to fabricate from inexpensive materials. The support rings, for example, may be made in one or at the most two stampings. Further, each support ring is the same, thereby eliminating the need for right-hand and left-hand members. Additionally, the present bearing means can be adapted to prevent relative longitudinal movement between the two telescoping members, or to move the telescoping members longitudinally relative to each other at a predetermined time and to a controlled extent.

Although the foregoing disclosure describes a presently preferred embodiment and modifications thereof, it is understood that the invention may be practiced in still other forms within the scope of the following claims.

I claim:

1. Bearing means to receive a shaft or the like for relative rotary movement including a tubular casing having notches in either end, support rings stationed within the casing and spaced apart axially thereof, said rings having tabs engaging the notches of said casing to prevent relative rotary movement between the casing and support rings, and also having journaling sockets, means to prevent movement of the support rings longitudinally of the casing comprising inwardly turned lugs on the casing engageable with said rings, elongate bearing elements having axle portions of reduced diameter loosely journaled in said journal sockets, and annular springs having fluted peripheries receiving the shaft portions of the elongate bearing elements within the fluted sections and urging said elements radially outwardly to position in said journaling sockets.

2. Bearing means to receive a shaft or the like for relative rotary movement, including a tubular casing having notches in either end thereof, support rings stationed within the casing and spaced apart axially thereof, said rings having tabs engaging said notches to prevent relative rotary movement between the casing and support rings, and also having opposed mating bearings, elongate bearing elements having pintle portions received in said bearings, and means to prevent movement of the support rings longitudinally of the casing comprising lugs on the casing engageable with said rings.

3. Bearing means to receive a shaft comprising a tubular casing, circular plates fitted within and crosswise of the casing, and spaced apart axially thereof, each of said plates having a central opening therethrough for said shaft, there being mating radial bearing grooves stamped in the opposed faces of said plates, each groove terminating at its outer end in a journal bearing, elongate bearing elements having their ends engaging respective pairs of said bearings for limiting radially outward movement of said elements, said casing and said plates being formed with complementary means keying them against relative rotation, and lug means on the ends of the casing engaging said plates to prevent movement thereof axially of said casing.

4. A shaft bearing comprising a tubular casing, support rings fitted within and transversely of the casing in spaced relation, means restraining said rings against rotation and outward axial movement relative to said casing, the opposing faces of said rings being each formed with a plurality of mating blind grooves, each groove extending radially from the inner edge of the ring and terminating in a rounded journal bearing, elongate bearing elements disposed between the rings, each element having pintles at either end seated in a mating pair of said bearings and maintaining the rings apart, an expansible spring ring disposed at either end of said bearing elements engaging the pintles thereof, and urging said elements radially into said bearings.

5. A shaft bearing comprising a tubular casing, support rings for antifriction roller elements fitted within and transversely of the casing in spaced relation, means restraining said rings individually against rotation and outward axial movement relative said casing, the opposing faces of said rings being each stamped with a plurality of mating blind grooves impressed therein, each groove extending radially from the inner edge of the ring and terminating in a rounded journal bearing, elongate roller elements disposed between said rings, each element having pintles at either end seated in a mating pair of said bearings and maintaining said rings apart.

6. Bearing means for a portion of a shaft having a circumferential groove formed therein, comprising a tubular casing, circular plates fitted within and crosswise the casing and spaced apart axialy thereof, means restraining said plates against rotary or outward axial movement in said casing, each of said plates having a central opening therethrough for receiving said shaft with said groove between the plates, each of said plates being formed with bearings disposed in a circular path medially the inner and outer peripheries thereof, the bearings of one plate being opposite and mating the bearings of the other, elongate bearing elements each having a pintle at either end seated in a mating pair of said bearings and maintaining said plates apart, at least one of said bearing elements being formed with a radially enlarged portion corresponding to and engaged in the groove of said shaft.

7. Bearing means as defined in claim 6 wherein the path of the circumferential groove in said shaft is elliptical, thus effecting relative reciprocable movement of said casing and shaft during the rotation of the shaft.

8. A shaft bearing comprising a cylindrical casing, rigid ring supports fitted between the ends of said casing, said supports comprising identical stampings and the opposed walls of the supports each having a series of bearing recesses impressed therein, the series being in the outline of a circle concentric with the opening in the support, said supports being so oriented as to align mating pairs of recesses, elongate bearing elements disposed between the supports and each having its ends journaled in a pair of said recesses and maintaining the supports apart, complemental means provided on the casing and supports for restraining relative rotation therebetween, and additional means, integral with the ends of said casing, engaging each support at a plurality of points spaced about its edge and preventing outward movement of said supports.

References Cited in the file of this patent

UNITED STATES PATENTS

| | | |
|---|---|---|
| 384,023 | Corbett | June 5, 1888 |
| 602,047 | Hobron | Apr. 5, 1898 |
| 2,016,923 | Herrmann | Oct. 8, 1935 |
| 2,474,016 | Smith | June 21, 1949 |
| 2,611,670 | Palmgren | Sept. 23, 1952 |

FOREIGN PATENTS

| | | |
|---|---|---|
| 372,145 | Germany | Mar. 22, 1923 |
| 458,243 | Great Britain | Dec. 15, 1936 |